(12) United States Patent
Senoue et al.

(10) Patent No.: US 11,965,575 B2
(45) Date of Patent: Apr. 23, 2024

(54) HYSTERESIS TORQUE GENERATING MECHANISM AND POWER TRANSMISSION DEVICE

(71) Applicant: EXEDY Corporation, Neyagawa (JP)

(72) Inventors: Takeshi Senoue, Neyagawa (JP); Masahiro Nakatani, Neyagawa (JP)

(73) Assignee: EXEDY Corporation, Neyagawa (JP)

( * ) Notice: Subject to any disclaimer, the term of this patent is extended or adjusted under 35 U.S.C. 154(b) by 397 days.

(21) Appl. No.: 17/408,823

(22) Filed: Aug. 23, 2021

(65) Prior Publication Data

US 2022/0090634 A1 Mar. 24, 2022

(30) Foreign Application Priority Data

Sep. 23, 2020 (JP) ................................ 2020-158318

(51) Int. Cl.
*F16F 15/129* (2006.01)

(52) U.S. Cl.
CPC ................ *F16F 15/1292* (2013.01)

(58) Field of Classification Search
CPC .......... F16D 7/024; F16D 7/025; F16D 7/028; F16D 43/213; F16D 43/215; F16D 43/216; F16F 15/129; F16F 15/1292; F16F 15/1295; F16F 15/1297; F16F 15/139; F16F 15/1392; F16F 15/1395; F16F 15/1397
USPC ..................... 464/45, 46, 47, 48, 68.4, 68.41
See application file for complete search history.

(56) References Cited

U.S. PATENT DOCUMENTS

| | | | |
|---|---|---|---|
| 5,505,288 A * | 4/1996 | Tomiyama ............ | F16F 15/129 464/68.41 |
| 6,186,898 B1 * | 2/2001 | Lopez ................... | F16F 15/123 464/68.41 |
| 7,516,828 B2 | 4/2009 | Kitada | |
| 7,819,751 B2 * | 10/2010 | Ebata .................. | F16F 15/1395 464/68.41 |
| 7,934,997 B2 * | 5/2011 | Avins .................. | F16F 15/1297 464/68.1 |
| 8,371,948 B2 * | 2/2013 | Usui ................... | F16F 15/1203 464/68.1 |

(Continued)

FOREIGN PATENT DOCUMENTS

| | | | | |
|---|---|---|---|---|
| EP | 3438488 A1 * | 2/2019 | ......... | F16F 15/1297 |
| JP | 1985-088126 U | 6/1985 | | |

(Continued)

OTHER PUBLICATIONS

Notice of Rejection for corresponding Japanese application dated Feb. 20, 2024.

*Primary Examiner* — Josh Skroupa
(74) *Attorney, Agent, or Firm* — United IP Counselors, LLC

(57) ABSTRACT

A hysteresis torque generating mechanism includes a first rotor having a slide surface, and a second rotor opposed to the first rotor. The second rotor is configured to slide against the slide surface of the first rotor so as to generate a hysteresis torque. The second rotor includes an initial contact portion and a main friction surface. The initial contact portion is provided to protrude toward the first rotor. The initial contact portion is configured to slide in contact with the slide surface of the first rotor. The main friction surface is configured to slide in contact with the slide surface of the first rotor after abrasion of the initial contact portion.

7 Claims, 7 Drawing Sheets

(56) References Cited

U.S. PATENT DOCUMENTS

| | | | | |
|---|---|---|---|---|
| 8,419,553 B2* | 4/2013 | Sekine | .............. | F16F 15/12366 |
| | | | | 464/68.8 |
| 8,696,474 B2* | 4/2014 | Saeki | .................. | F16F 15/1292 |
| | | | | 464/68.41 |
| 8,795,093 B2* | 8/2014 | Saeki | .................. | F16F 15/1297 |
| | | | | 464/68.41 |
| 8,939,843 B2* | 1/2015 | Copeland | ............ | F16F 15/1297 |
| | | | | 464/68.41 |
| 2021/0033151 A1* | 2/2021 | Kremper | ............. | F16F 15/1292 |

FOREIGN PATENT DOCUMENTS

| | | | | | |
|---|---|---|---|---|---|
| JP | 1996093787 | | 4/1996 | | |
| JP | H0893787 A | * | 4/1996 | ............. | F16D 13/62 |
| JP | H09-242823 A | | 9/1997 | | |
| JP | 2006002930 A | | 1/2006 | | |
| JP | 2006144861 B | | 1/2011 | | |

* cited by examiner

HYSTERESIS TORQUE GENERATING MECHANISM AND POWER TRANSMISSION DEVICE

CROSS-REFERENCE TO RELATED APPLICATIONS

This application claims priority to Japanese Patent Application No. 2020-158318, filed Sep. 23, 2020. The entire contents of that application are incorporated by reference herein in their entirety.

TECHNICAL FIELD

The present invention relates to a hysteresis torque generating mechanism and a power transmission device including the same.

BACKGROUND ART

A power transmission train for a vehicle is provided with a damper device for attenuating torsional vibrations. The damper device includes a hysteresis torque generating mechanism for generating a hysteresis torque, that is, friction resistance. As described in Japan Laid-open Patent Application Publication No. H09-242823, for instance, the hysteresis torque generating mechanism is composed of a friction member (friction washer), a cone spring, and so forth. The friction member is disposed between an input-side rotor and an output-side rotor that are rotatable relative to each other. The cone spring presses the input-side rotor against the output-side rotor. Besides, when the input-side rotor and the output-side rotor are rotated relative to each other by torsional vibrations, the friction member is unitarily rotated with one of the input-side rotor and the output-side rotor, while making frictional contact with the other. Accordingly, a hysteresis torque is generated.

A frictional slide surface of the friction member is abraded with use. Hence, a stable hysteresis torque can be obtained after the frictional slide surface is abraded to some extent.

However, in an initial phase of use, the frictional slide surface becomes non-uniform in shape due to manufacturing errors or so forth. Because of this, the friction member does not stably make contact with a member provided as a contact target, whereby a hysteresis torque is not stabilized in the initial phase of use.

It is an object of the present invention to stabilize a hysteresis torque generated by a friction member in an initial phase of use.

BRIEF SUMMARY (1) A hysteresis torque generating mechanism according to the present invention includes a first rotor including a slide surface and a second rotor. The second rotor is opposed to the first rotor and slides against the slide surface of the first rotor so as to generate a hysteresis torque. The second rotor includes an initial contact portion and a main friction surface. The initial contact portion is provided to protrude toward the first rotor and slides in contact with the slide surface of the first rotor. The main friction surface slides in contact with the slide surface of the first rotor after abrasion of the initial contact portion.

Here, in the initial phase of using the second rotor, the initial contact portion slides in contact with the slide surface of the first rotor. In other words, a friction member is provided, on purpose, with a portion that makes contact with a contact target in the initial phase of use. Hence, a desired hysteresis torque can be obtained in the initial phase of use. Then, after abrasion of the initial contact portion, the main friction surface, including the abraded initial contact portion, slides in contact with the slide surface of the first rotor.

(2) Preferably, the first rotor is a member that a power is inputted thereto and is then transmitted therefrom to an output-side member. Besides, the second rotor is a friction member rotatable relative to the first rotor.

(3) Preferably, the initial contact portion has an annular shape.

(4) Preferably, the second rotor includes a body and a friction material. The friction material is fixed to the body and includes the initial contact portion and the main friction surface on a surface thereof.

(5) Preferably, the body is made of resin and the friction material is insert-molded to the body.

(6) A power transmission device according to the present invention includes an input-side rotor, an output-side rotor, a plurality of elastic members, and a hysteresis torque generating mechanism. The output-side rotor is provided to be rotatable relative to the input-side rotor. The plurality of elastic members elastically couple the input-side rotor and the output-side rotor in a rotational direction. The hysteresis torque generating mechanism generates a hysteresis torque in relative rotation between the input-side rotor and the output-side rotor.

Besides, the hysteresis torque generating mechanism includes a friction member and a pressing member. The friction member is disposed axially between the input-side rotor and the output-side rotor. The pressing member presses a first lateral surface of the friction member onto a lateral surface of either the input-side rotor or the output-side rotor. Furthermore, the friction member includes an initial contact portion and a main friction surface. The initial contact portion is provided to axially protrude from the first lateral surface and slides in contact with the lateral surface of either the input-side rotor or the output-side rotor. The main friction surface slides in contact with the lateral surface of either the input-side rotor or the output-side rotor after abrasion of the initial contact portion (7) Preferably, the pressing member includes a contact portion making contact with a second lateral surface of the friction member. Besides, the contact portion and the initial contact portion of the friction member overlap as seen in a direction arranged along a rotational axis.

Overall, according to the present invention described above, it is possible to obtain a friction member that generates a hysteresis torque stabilized in an initial phase of use.

DETAILED DESCRIPTION

[Entire Configuration]

Figure 1:
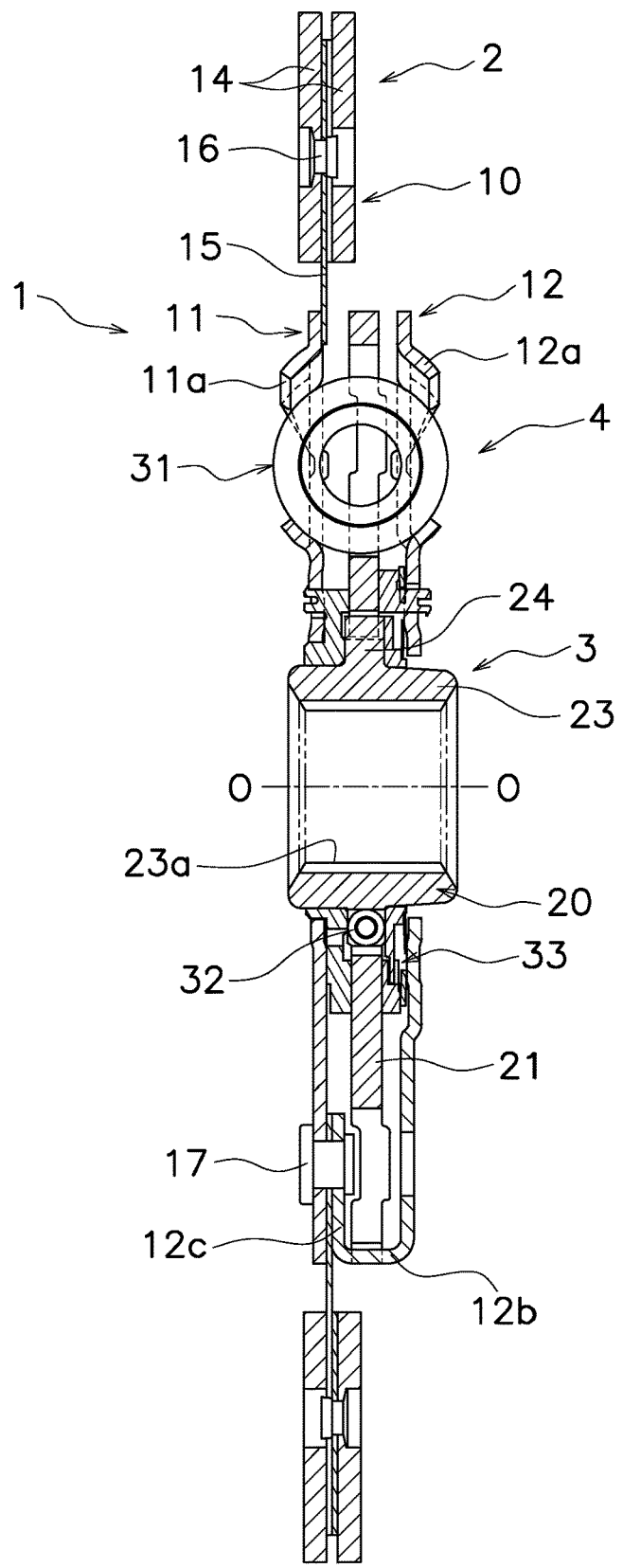
FIG. 1 is a cross-sectional view of a clutch disc assembly including a hysteresis torque generating mechanism according to a preferred embodiment of the present invention.
Figure 2:
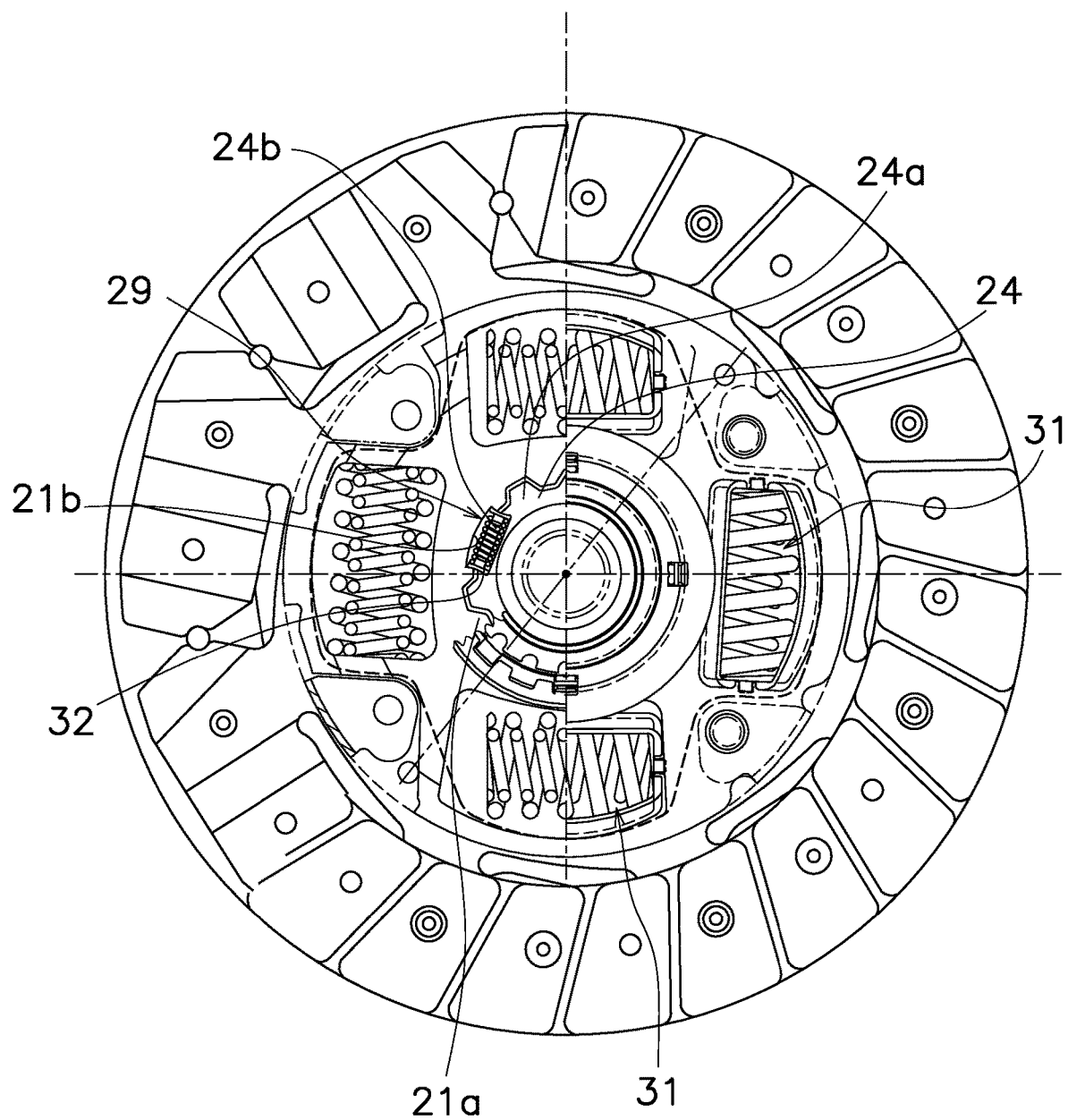
FIG. 2 is a front view of the hysteresis torque generating mechanism shown in FIG. 1.

FIG. 1 is a cross-sectional view of a clutch disc assembly 1 (exemplary power transmission device) including a hysteresis torque generating mechanism according to a preferred embodiment of the present invention. On the other hand, FIG. 2 is a front view of the clutch disc assembly 1. In FIG. 1, line O-O indicates the rotational axis of the clutch disc assembly 1. Besides in FIG. 1, an engine and a flywheel (both not shown in the drawing) are disposed on the left side, whereas a transmission (not shown in the drawing) is disposed on the right side.

The clutch disc assembly 1 includes an input-side rotor 2, an output-side rotor 3, and a damper mechanism 4.

[Input-side Rotor 2]

The input-side rotor 2 includes a clutch disc 10, a clutch plate 11, and a retaining plate 12.

<Clutch Disc 10>

The clutch disc 10 includes a pair of friction facings 14 each having an annular shape and a cushioning plate 15. The pair of friction facings 14 are fixed to both surfaces of the cushioning plate 15 by rivets 16. Besides, the cushioning plate 15 is fixed to an outer peripheral part of the clutch plate 11 by rivets 17.

<Clutch Plate 11 and Retaining Plate 12>

The clutch plate 11 and the retaining plate 12, each of which is a disc-shaped member, are fixed to each other by the rivets 17, while being disposed at a predetermined interval in an axial direction. The clutch plate 11 and the retaining plate 12 each include four holding portions 11a, 12a. The holding portions 11a and the holding portions 12a are provided in opposed positions. The four holding portions 11a, 12a are disposed at predetermined intervals in a circumferential direction.

The retaining plate 12 includes stopper portions 12b and fixation portions 12c. The stopper portions 12b are formed by partially bending an outer peripheral part of the retaining plate 12 toward the clutch plate 11 so as to extend in the axial direction. The fixation portions 12c are formed by further bending the stopper portions 12b to the inner peripheral side. The stopper portions 12b compose a stopper mechanism (to be described). As described above, the fixation portions 12c are fixed together with the cushioning plate 15 to the clutch plate 11 by the rivets 17.

[Output-side Rotor 3]

The output-side rotor 3 is rotatable relative to the input-side rotor 2 and includes a spline hub 20 and a hub flange 21 (exemplary first rotor).

<Spline Hub 20>

The spline hub 20 includes a tubular portion 23 and a flange 24. The tubular portion 23 is provided with a spline hole 23a as the inner peripheral surface thereof. The spline hole 23a is capable of being engaged with an input shaft (not shown in the drawings) of the transmission. The flange 24 extends radially outward from an approximately axial middle part of the tubular portion 23. The flange 24 is provided with a plurality of outer peripheral teeth 24a and a plurality of cutouts 24b on the outer peripheral surface thereof <Hub Flange 21>

Figure 3:
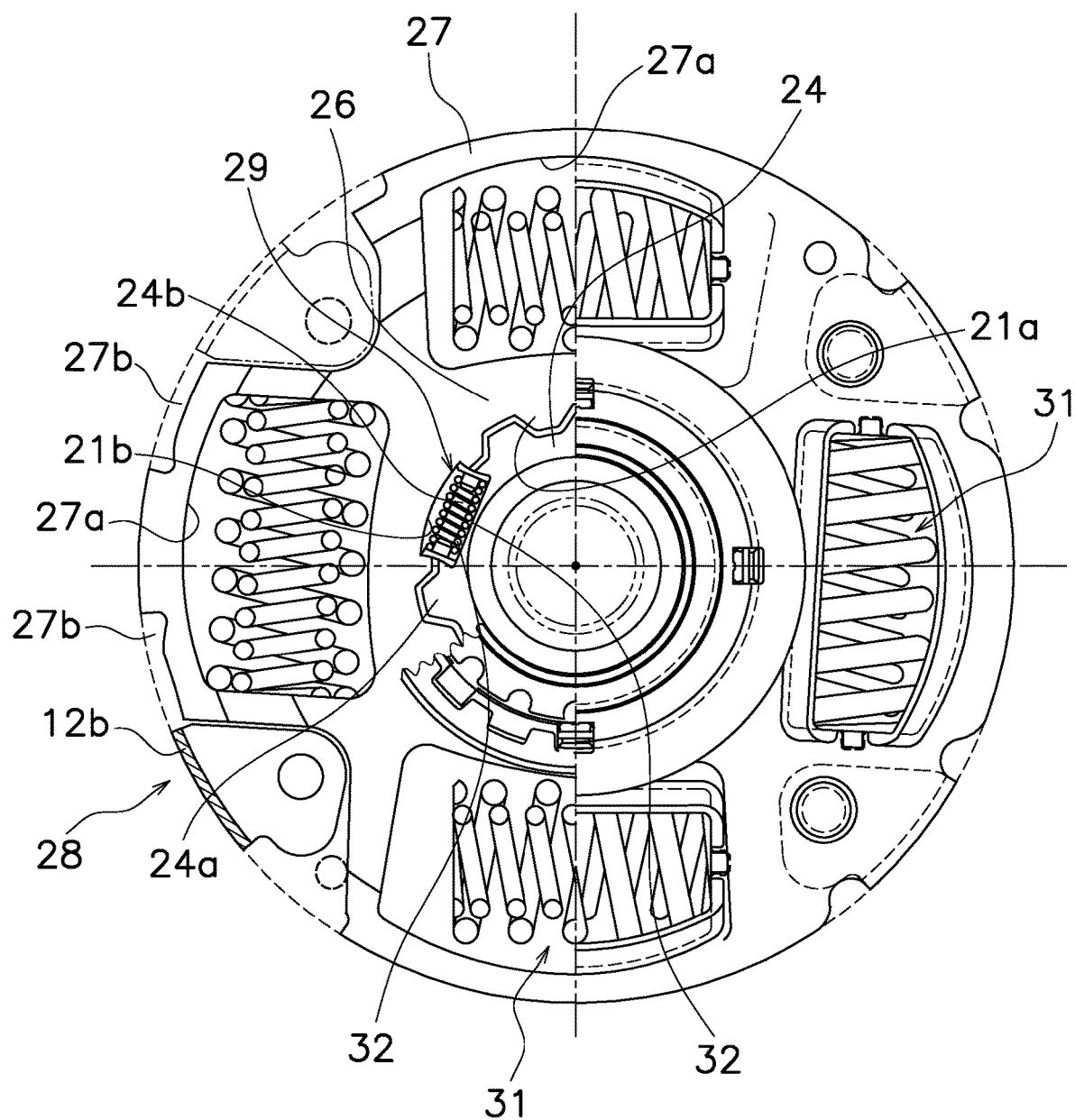
FIG. 3 is a front view of an output-side rotor and a damper mechanism.

The hub flange 21 has a disc shape and is disposed on the outer peripheral side of the spline hub 20. The hub flange 21 is disposed axially between the clutch plate 11 and the retaining plate 12. As shown in FIGS. 2 and 3, the hub flange 21 includes an annular portion 26 and four protruding portions 27. Each of the four protruding portions 27 is provided with a window hole 27a. Besides, each of the four protruding portions 27 is provided with stopper cutouts 27b on the outer peripheral surface thereof except for the circumferential middle of the outer peripheral surface. The cutouts 27b are axially penetrated by the stopper portions 12b of the retaining plate 12. In other words, the stopper portions 12b of the retaining plate 12 and circumferential end surfaces of the cutouts 27b compose a stopper mechanism 28 that restricts torsion (relative rotation) between the hub flange 21 and both the clutch plate 11 and the retaining plate 12 to a predetermined torsion angular range.

On the other hand, the hub flange 21 is provided with a plurality of inner peripheral teeth 21a and a plurality of cutouts 21b on the inner peripheral surface thereof. The plural inner peripheral teeth 21a are engaged with the outer peripheral teeth 24a of the spline hub 20, respectively, through predetermined gaps. The cutouts 21b are provided in positions radially opposed to the cutouts 24b of the spline hub 20, respectively. Therefore, pairs of cutouts 24b and 21b of the spline hub 20 and the hub flange 21 form spring accommodation portions 29.

[Damper Mechanism 4]

The damper mechanism 4 includes four high stiffness springs 31, two low stiffness springs 32, and a hysteresis torque generating mechanism (hereinafter referred to as "hysteresis generating mechanism") 33.

<High Stiffness Springs 31 and Low Stiffness Springs 32>

The high stiffness springs 31 are accommodated in the window holes 27a of the hub flange 21, respectively, while being held in both radial and axial directions by pairs of the holding portions 11a and 12a of the clutch plate 11 and the retaining plate 12, respectively. The low stuffiness springs 32 are accommodated in the spring accommodation portions 29, respectively, each of which is formed by pairs of cutouts 24b and 21b of the spline hub 20 and the hub flange 21. It should be noted that two of the four high stiffness springs 31 are each set to be shorter than the circumferential length of each window hole 27a, although detailed explanation thereof will be hereinafter omitted. Besides, each of the four high stiffness springs 31 makes contact at the end surfaces thereof with the end surfaces of each pair of holding portions 11a and 12a of the clutch plate 11 and the retaining plate 12. With the configuration herein described, multistage torsional characteristics are realized.

<Hysteresis Generating Mechanism 33>

Figure 4:
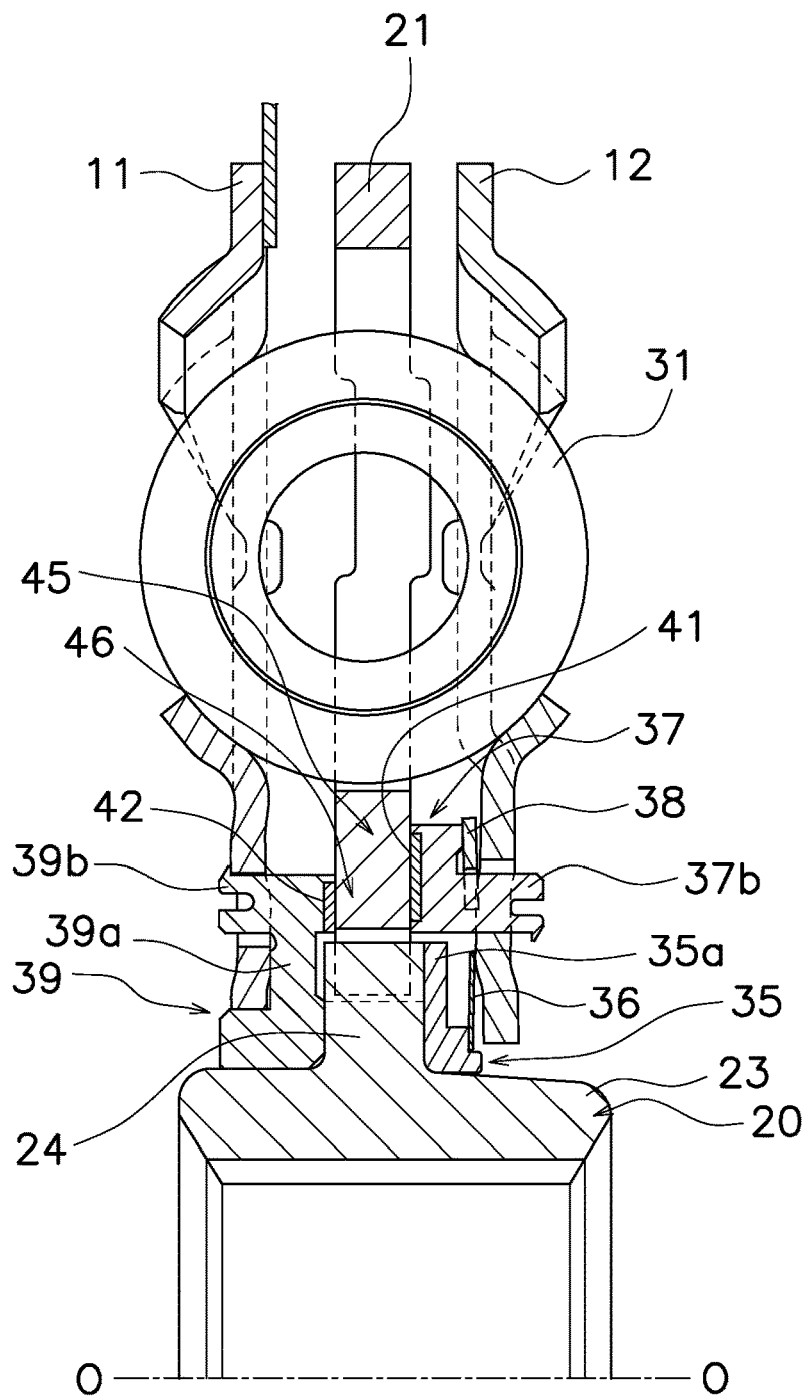
FIG. 4 is an enlarged view of a part of FIG. 1.
Figure 5:
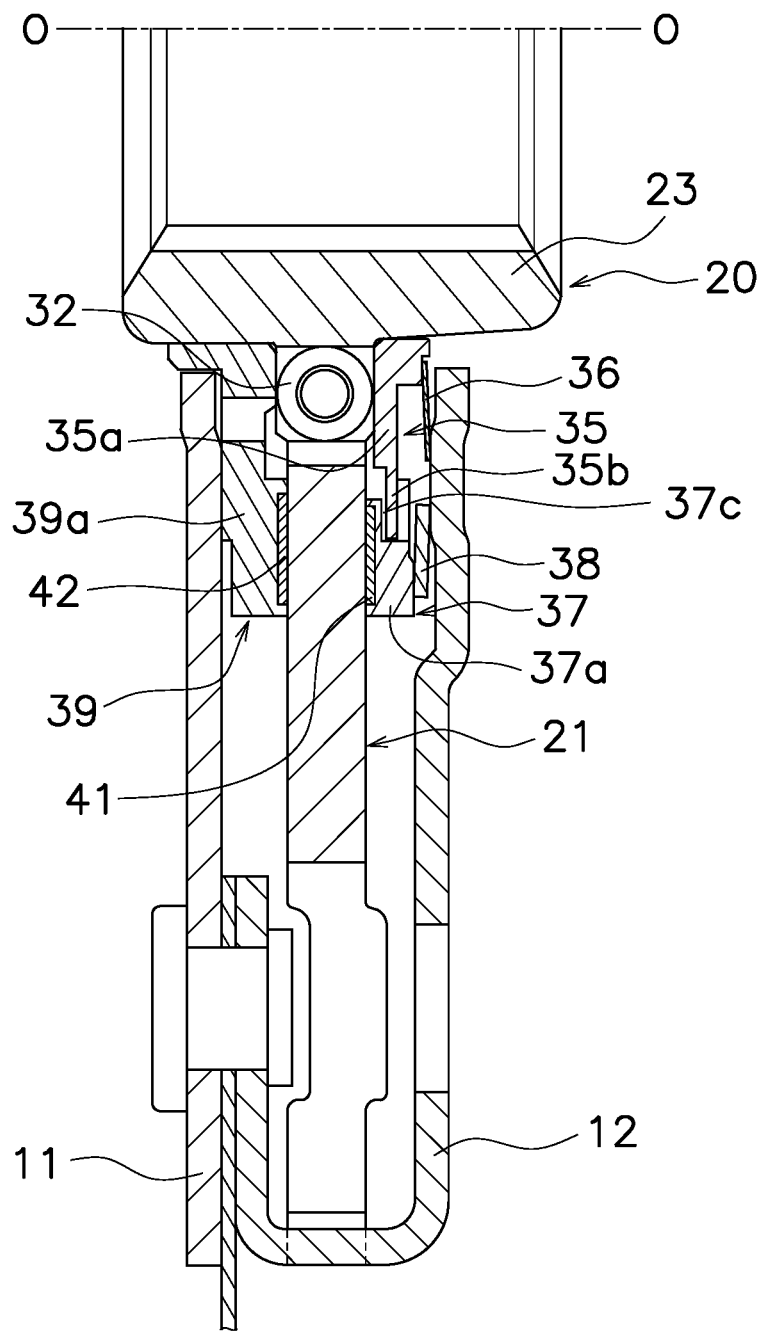
FIG. 5 is an enlarged view of another part of FIG. 1 that is different from the part shown in FIG. 4.

As shown in FIGS. 4 and 5, the hysteresis generating mechanism 33 includes a first friction washer 35, a first cone spring 36, a second friction washer 37 (exemplary friction member), a second cone spring 38, and a third friction washer 39 (another exemplary friction member).

—First Friction Washer 35—

The first friction washer 35 is disposed on the outer peripheral side of the tubular portion 23, while being disposed axially between the flange 24 of the spline hub 20 and an inner peripheral part of the retaining plate 12. The first friction washer 35 is made of resin. The first friction washer 35 includes a body 35a having an annular shape and a plurality of protrusions 35b.

The body 35a makes contact with the transmission-side surface of the flange 24 and interposes the first cone spring 36 together with the retaining plate 12 therebetween. The first cone spring 36 is axially compressed between the body 35a and the retaining plate 12. Because of this, the first friction washer 35 is pressed in contact with the flange 24 at a friction surface thereof by the first cone spring 36.

The plural protrusions 35b extend radially outward from the body 35a. The plural protrusions 35b are engaged with recesses 37c (to be described) of the second friction washer 37. Accordingly, the first friction washer 35 and the second friction washer 37 are unitarily rotatable.

—Second Friction Washer 37—

The second friction washer 37 is disposed on the outer peripheral side of the first friction washer 35, while being disposed between an inner peripheral part of the hub flange 21 and that of the retaining plate 12. The second friction washer 37 is made of resin and includes a body 37a having an annular shape, a plurality of engaging portions 37b, and the recesses 37c.

The body 37a makes contact with the transmission-side surface of the hub flange 21. The second cone spring 38 is disposed between the body 37a and the retaining plate 12, while being compressed therebetween. Accordingly, the body 37a is pressed in contact with the hub flange 21 by the second cone spring 38.

Figures 6, 6A, 6B:
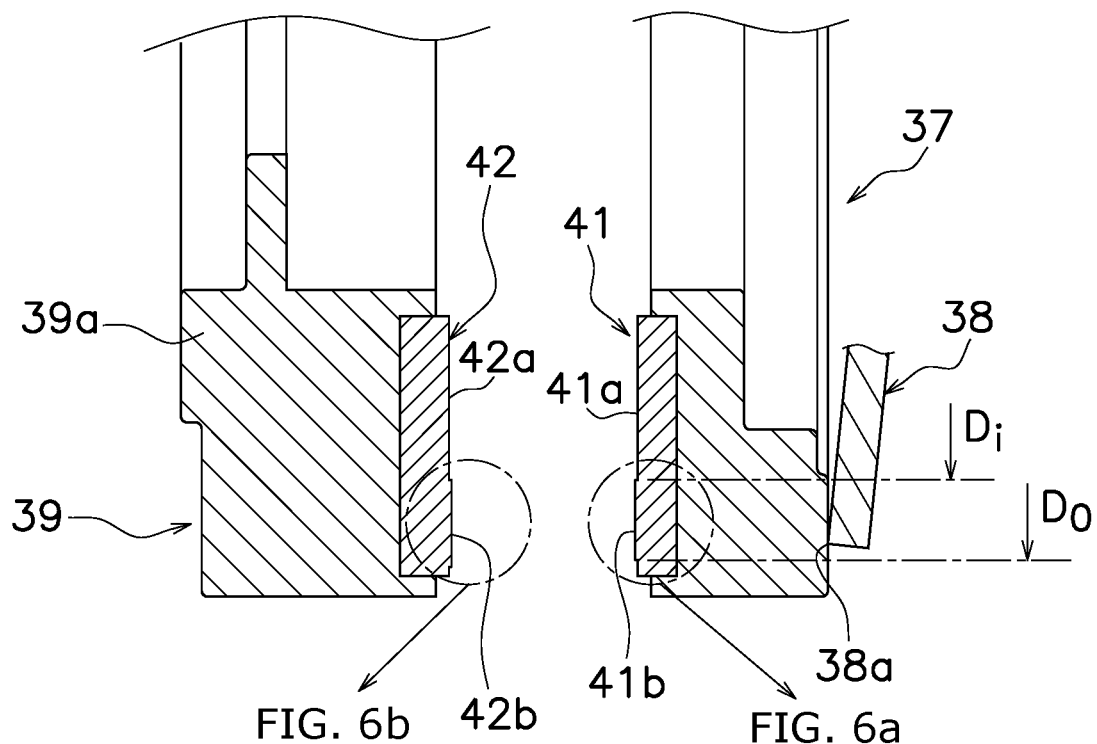
FIG. 6 is a partial cross-sectional view of a friction washer, with FIGS. 6a and 6b being enlarged views of the circled portions in FIG. 6.

FIGS. 6, 6a, and 6b show close-up in part the second friction washer 37 and the third friction washer 39. As shown in FIGS. 6 and 6a, a friction material 41 having an annular shape is fixed to the hub flange 21-side surface of the body 37a by insert molding.

The friction material 41 includes a main friction surface 41a and an initial contact portion 41b. The main friction surface 41a is provided on the hub flange 21-side surface of the friction material 41. The initial contact portion 41b is provided radially in part on the main friction surface 41a and protrudes toward the hub flange 21. In more detail, the initial contact portion 41b has an annular shape and the hub flange 21-side surface thereof is a flat surface. Besides, the second cone spring 38 makes contact at a contact portion 38a with the body 37a of the second friction washer 37, and the contact portion 38a is located radially between the inner diameter (Di) and the outer diameter (Do) of the initial contact portion 41b. Because of this, the initial contact portion 41b is efficiently pressed in contact with the lateral surface of the hub flange 21 by the second cone spring 38.

It should be noted that the initial contact portion 41b protrudes from the main friction surface 41a by a height h, and the protruding height h is set to be 0.04 mm in the present preferred embodiment. It is preferable to appropriately set the protruding height of the initial contact portion 41b depending on a kind of friction material.

With the configuration of the second friction washer 37 described above, the friction material 41 reliably makes frictional contact at only the initial contact portion 41b with the hub flange 21 in the initial phase of use. Therefore, a hysteresis torque generated by this frictional contact is stabilized to have a desired design value. When the initial contact portion 41b is then abraded with use, the main friction surface 41a, including the initial contact portion 41b provided in a region thereof, is configured to slide in contact with the hub flange 21.

The engaging portions 37b extend toward the transmission from an inner peripheral part of the body 37a and penetrate holes provided in the retaining plate 12, respectively. Accordingly, the second friction washer 37 and the retaining plate 12 are unitarily rotatable.

The recesses 37c are provided on the transmission side of the inner peripheral part of the body 37a. The protrusions 35b of the first friction washer 35 are engaged with the recesses 37c. Because of this, the first friction washer 35 is unitarily rotatable with the retaining plate 12 through the second friction washer 37.

It should be noted that the first cone spring 36 is designed to exert an urging force smaller than that exerted by the second cone spring 38. Besides, the first friction washer 35 has a friction coefficient smaller than that of the second friction washer 37. Because of this, a hysteresis torque generated by the first friction washer 35 is made extremely smaller than that generated by the second friction washer 37.

—Third Friction Washer 39—

The third friction washer 39 is disposed on the outer peripheral side of the tubular portion 23, while being interposed between the flange 24 of the spline hub 20 and an inner peripheral part of the clutch plate 11. The third friction washer 39 is made of, for instance, resin. The third friction washer 39 includes a body 39a having an annular shape and a plurality of engaging portions 39b.

The body 39a makes contact at one lateral surface thereof with the engine-side surface of the flange 24 and that of the hub flange 21, while making contact at the other lateral surface thereof with the transmission-side surface of the clutch plate 11. The engaging portions 39b extend toward the engine from the body 39a and penetrate holes provided in the clutch plate 11. The third friction washer 39 is made unitarily rotatable with the clutch plate 11 by the engaging protrusions 39b. Besides, the body 39a is engaged with a center hole of the clutch plate 11 so as to be non-rotatable relative to the clutch plate 11, while making contact at the inner peripheral surface thereof with the outer peripheral surface of the tubular portion 23 of the spline hub 20 so as to be slidable thereon. In other words, the clutch plate 11 is radially positioned by the spline hub 20 through the third friction washer 39.

Now, as shown in FIGS. 6 and 6b, a friction material 42 having an annular shape is fixed to the hub flange 21-side surface of the body 39a of the third friction washer 39 by insert molding.

The friction material 42 of the third friction washer 39 is configured in approximately the same manner as the friction material 41 of the second friction washer 37. Specifically, the friction material 42 includes a main friction surface 42a and an initial contact portion 42b. The main friction surface 42a is provided on the hub flange 21-side surface of the friction material 42. The initial contact portion 42b is provided radially in part on the main friction surface 42a, has an annular shape, and protrudes toward the hub flange 21. Besides, the surface of the initial contact portion 42b is a flat surface. Furthermore, the initial contact portion 42b protrudes from the main friction surface 42a by a height h, and the protruding height h is also configured in the same manner as that configured for the friction material 41 of the second friction washer 37.

With the configuration of the third friction washer 39 described above, the initial contact portion 42b reliably makes frictional contact with the hub flange 21 in the initial phase of use as described above. On the other hand, when the initial contact portion 42b is abraded with use, the main friction surface 42a, including the initial contact portion 42b provided in a region thereof, is configured to slide in contact with the hub flange 21.

As described above, the second friction washer 37 and the third friction washer 39 compose a large hysteresis generating mechanism 45, whereas the first friction washer 35 and the third friction washer 39 compose a small hysteresis generating mechanism 46. Here, when relative rotation occurs among the input-side rotor 2, the hub flange 21, and the spline hub 20, hysteresis torques are generated by the large hysteresis generating mechanism 45 and the small hysteresis generating mechanism 46, whereby torsional vibrations are attenuated and absorbed.

[Actions]

When an input torque is small in magnitude or a torque less fluctuates, only the low stiffness springs 32 are compressed and the small hysteresis generating mechanism 46 generates a hysteresis torque. As a result, characteristics with low stiffness and low hysteresis torque are obtained in a low torsion angular range.

When the torsion angle increases with increase in torque, the outer peripheral teeth 24a of the flange 24 of the spline hub 20 make contact with the inner peripheral teeth 21a of the hub flange 21. Because of this, when the torsion angle increases, the spline hub 20 and the hub flange 21 are unitarily rotated.

When the torsion angle further increases from the condition herein made, relative rotation occurs between the hub flange 21 and the input-side rotor 2, and two of the four high stiffness springs 31 are compressed. At this time, not only the small hysteresis generating mechanism 46 but also the high hysteresis generating mechanism 45 generates a hysteresis torque.

When the torsion angle then further increases, all the high stiffness springs 31 are compressed. Therefore, characteristics with higher possible stiffness and higher possible hysteresis torque are obtained.

In the actions described above, frictional contact occurs in the initial phase of use only at the initial contact portion 41b, 42b of the friction material 41, 42 in each of the second and third friction washers 37 and 39. In other words, a hysteresis torque is generated only at portions intended by design. Because of this, a desired and stable initial hysteresis torque can be obtained.

Besides, when the initial contact portion 41b, 42b is abraded with use, frictional contact occurs at the main friction surface 41a, 42a including the initial contact portion 41b, 42b in each of the second and third friction washers 37 and 39. Therefore, a desired and stable hysteresis torque can be herein obtained as well.

Other Preferred Embodiments

The present invention is not limited to the preferred embodiment described above, and a variety of changes or modifications can be made without departing from the scope of the present invention.

Figure 7:
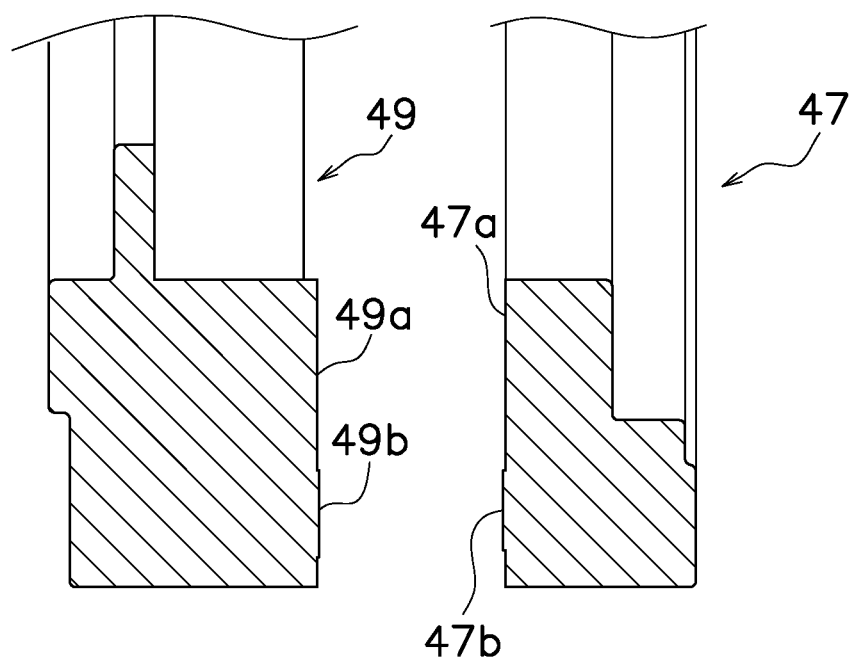
FIG. 7 is a view of a friction washer according to another preferred embodiment of the present invention shown in corresponding manner to the enlarged views of FIGS. 6a and 6b.

(a) In the preferred embodiment described above, in each of the second and third friction washers, two members, i.e., the body and the friction material, are shaped to be integrated by insert molding. However, these members can be provided as a single member. This example is shown in FIG. 7. In this example, each of second and third friction washers 47 and 49 includes an initial contact portion 47b, 49b formed by protruding in part a friction surface 47a, 49a (corresponding to the main friction surface) toward the hub flange 21. The specific shape and structure of the initial contact portion 47b, 49b are similar to those of the corresponding one in the preferred embodiment described above.

(b) The shape of the initial contact portion is not limited to that in the preferred embodiment described above. For example, the surface of the initial contact portion can be made in shape of a spherical surface instead of a flat surface. Moreover, or alternatively, the initial contact portion can be made in shape of not a continuous annulus but an intermittent annulus.

(c) In the preferred embodiment described above, the cone spring is configured to make contact with the initial contact portion in the position located between the inner diameter and the outer diameter of the initial contact portion. However, the contact position of the cone spring can be set on the inner side of the inner diameter of the initial contact portion or on the outer side of the outer diameter of the initial contact portion.

(d) In the preferred embodiment described above, the friction material of the present invention has been applied to the clutch disc assembly. However, the friction material can be applied to a hysteresis generating mechanism of another type of vibration absorbing device.

(e) In the preferred embodiment described above, the friction member is provided with the initial contact portion and the main friction surface. However, the hub flange can be provided with such an initial contact portion and a main friction surface on the friction surface thereof.

REFERENCE SIGNS LIST

2 Input-side rotor (first rotor)
3 Output-side rotor (second rotor)
4 Damper mechanism
11 Clutch plate (rotary member)
31 High stiffness spring
32 Low stiffness spring
33 Hysteresis generating mechanism
37 Second friction washer (friction member)
39 Third friction washer (friction member)
37a, 39a Body
38 Second cone spring (pressing member)
38a Contact portion
41, 42 Friction material
41a, 42a Main friction surface
41b, 42b Initial contact portion

What is claimed is:

1. A hysteresis torque generating mechanism comprising:
a first rotor including a slide surface; and
a second rotor opposed to the first rotor, the second rotor configured to slide against the slide surface of the first rotor so as to generate a hysteresis torque, wherein
the second rotor includes an initial contact portion and a main friction surface,
the initial contact portion is provided to protrude toward the first rotor, the initial contact portion configured to slide in contact with the slide surface of the first rotor, and
the main friction surface is configured to slide in contact with the slide surface of the first rotor after abrasion of the initial contact portion.

2. The hysteresis torque generating mechanism according to claim 1, wherein
the first rotor is configured such that a power is inputted thereto and then transmitted therefrom to an output-side member, and
the second rotor is a friction member rotatable relative to the first rotor.

3. The hysteresis torque generating mechanism according to claim 1, wherein the initial contact portion has an annular shape.

4. The hysteresis torque generating mechanism according to claim 1, wherein the second rotor includes
   a body, and
   a friction material fixed to the body, the friction material including the initial contact portion and the main friction surface on a surface thereof.

5. The hysteresis torque generating mechanism according to claim 4, wherein
   the body is made of resin, and
   the friction material is insert-molded to the body.

6. A power transmission device comprising:
   an input-side rotor;
   an output-side rotor provided to be rotatable relative to the input-side rotor;
   a plurality of elastic members configured to elastically couple the input-side rotor and the output-side rotor in a rotational direction; and
   a hysteresis torque generating mechanism configured to generate a hysteresis torque in relative rotation between the input-side rotor and the output-side rotor, wherein
   the hysteresis torque generating mechanism includes
      a friction member disposed axially between the input-side rotor and the output-side rotor, and
      a pressing member configured to press a first lateral surface of the friction member onto a rotor lateral surface of either the input-side rotor or the output-side rotor, and
   the friction member includes
      an initial contact portion provided to axially protrude from the first lateral surface, the initial contact portion configured to slide in contact with the rotor lateral surface of either the input-side rotor or the output-side rotor, and
      a main friction surface configured to slide in contact with the rotor lateral surface of either the input-side rotor or the output-side rotor after abrasion of the initial contact portion.

7. The power transmission device according to claim 6, wherein
   the pressing member includes a contact portion configured to contact a second lateral surface of the friction member, and
   the contact portion and the initial contact portion of the friction member overlap as seen in a direction along a rotational axis.

* * * * *